Aug. 21, 1962　　　　F. B. THORN, JR　　　　3,050,660
CURRENT RECTIFIER
Filed Aug. 10, 1959　　　　2 Sheets-Sheet 1
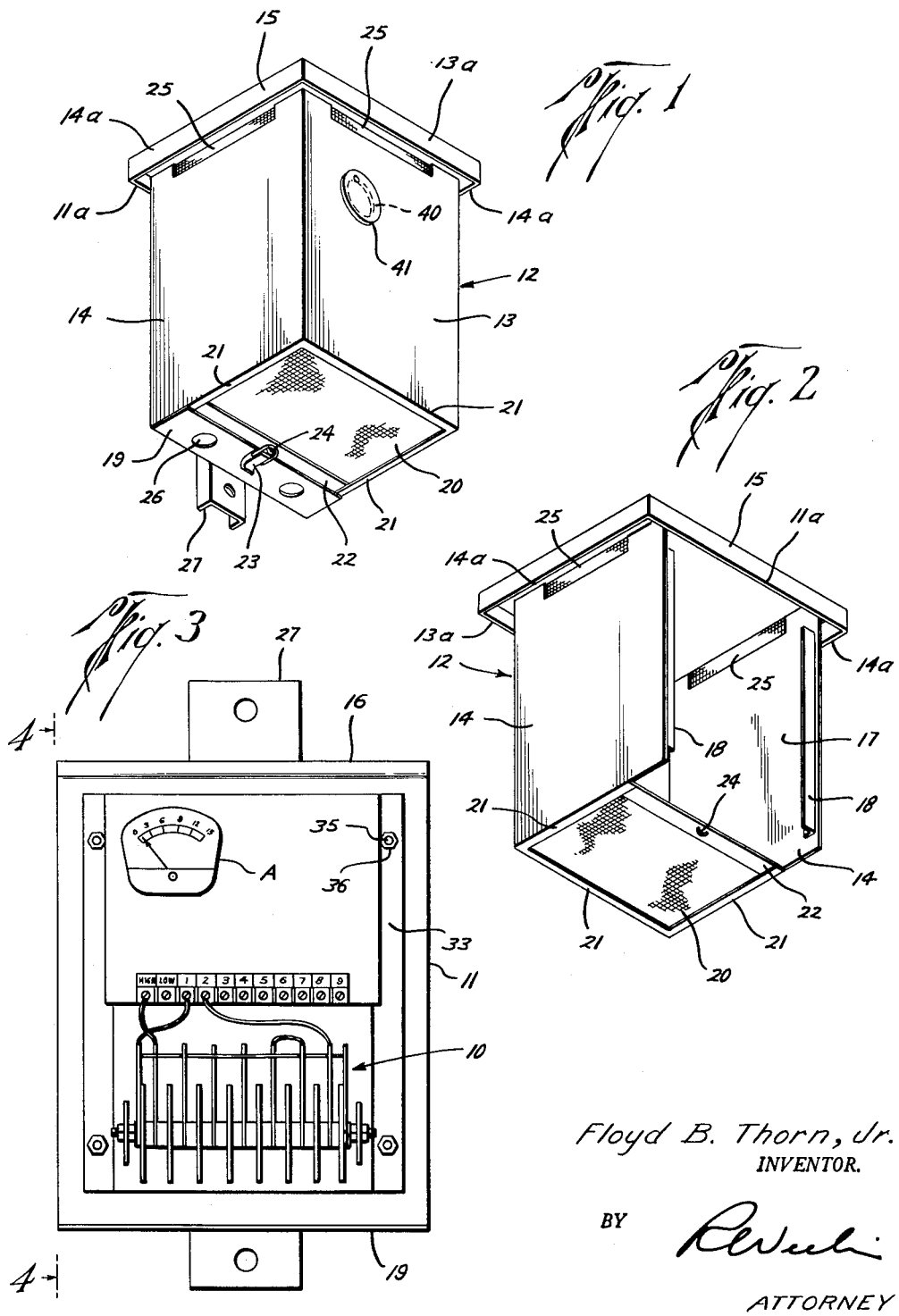
Floyd B. Thorn, Jr.
INVENTOR.
BY
ATTORNEY

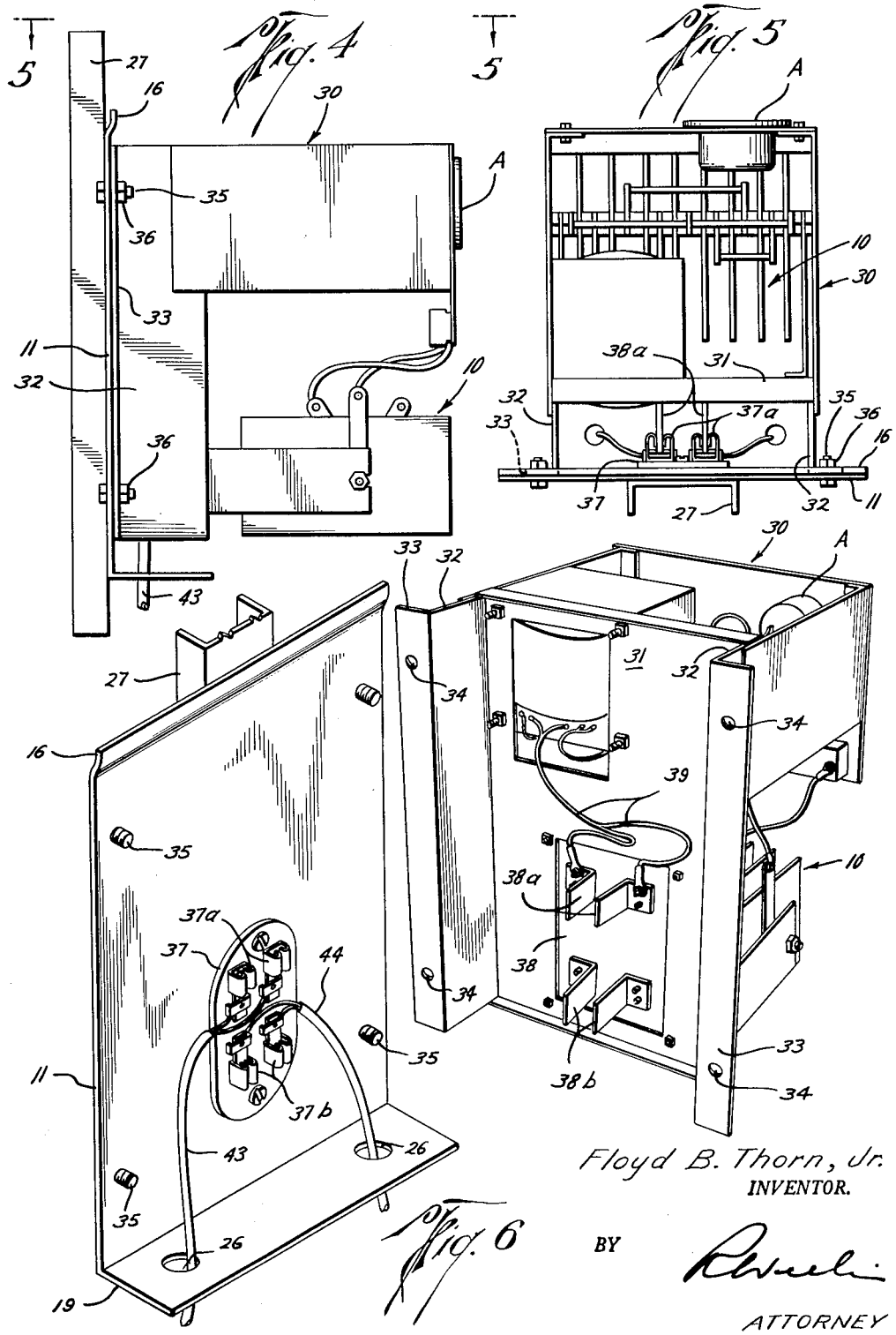

3,050,660
CURRENT RECTIFIER
Floyd B. Thorn, Jr., Houston, Tex., assignor to Cathodic Protection Service, Houston, Tex., a partnership
Filed Aug. 10, 1959, Ser. No. 832,721
1 Claim. (Cl. 317—99)

This invention relates to alternating current rectifiers, and particularly to an improved rectifier unit for use in oil and gas fields where it is desired to supply direct current to the oil and gas production equipment for purposes of cathodic protection of the equipment.

In all oil field services of the kind mentioned, equipment, such as the casings, pipe lines, and vessels of various types, are frequently subject to electrolytic corrosion and require cathodic protection to prevent such corrosion. Such cathodic protection apparatus normally requires a supply of direct current and as the supply of available current in oil and gas fields is generally alternating current, rectifiers are employed for providing the direct current for use in the cathodic protection apparatus.

Such rectifiers are often subject to break-downs or require repair for various reasons, and because of their usually remote location in oil and gas fields, their repair frequently involves extended shut-downs of the cathodic protection apparatus while the service men are brought to the location in order to repair the rectifier; or the more conventional rectifier unit, by reason of its relatively complicated construction and mounting, must be dismantled and brought to a repair shop, located usually a considerable distance from the field location.

The present invention has for its principal object, therefore, the provision of an improved rectifier unit so constructed that in the event repair is necessary, a complete rectifier unit may be substituted for the defective one, with minimum difficulty and with minimum loss of time in replacement.

Another object is the provision of the combination of a compact rectifier unit and a protective housing therefor in which the rectifier unit may be installed in the housing or removed therefrom by employing a relatively simple plug-in type of connection between the rectifier chassis and the housing by which the external wiring to the unit is not disturbed, thereby permitting removal and replacement of the unit in the housing by a simple and expeditious operation.

A more specific object is the provision, in combination with a rectifier unit of the character described, of an improved form of housing for enclosing the rectifier unit, the housing providing full weather protection for the rectifier, while permitting ready access for removal and replacement of the rectifier unit.

Other and more specific objects and advantages of this invention will become more readily apparent from the following detailed description when read in conjunction with the accompanying drawing which illustrates a useful embodiment in accordance with this invention.

In the drawing:

FIG. 1 is a perspective front elevational view of the housing for the rectifier unit;

FIG. 2 is a rear view, in perspective, of the front cover for the unit, removed from the back plate;

FIG. 3 is a front elevational view of the rectifier unit and the back plate on which it is mounted;

FIG. 4 is a side elevational view of the rectifier unit and the back plate taken along line 4—4 of FIG. 3;

FIG. 5 is a top plan view looking downwardly along line 5—5 of FIG. 4; and

FIG. 6 is a view, in perspective, showing the rectifier unit and back plate in separated relation.

Referring to the drawing:

The housing which encloses the rectifier unit, the latter being designated generally by the numeral 10, comprises a generally box-shaped structure formed by a back plate 11 and a front cover, designated generally by the numeral 12 (FIGS. 1 and 2). The latter, which is of generally box-like configuration, forms the front and side walls, as well as the top wall and a portion of the bottom wall of the housing, and in co-operation with the back plate, which forms the rear wall of the housing, is adapted to completely enclose the rectifier unit.

Front cover 12 comprises a front wall 13, side walls 14—14, and a top plate 15. The latter, which has a generally square configuration, concentric with that of the cover, is larger in its transverse dimensions than the corresponding dimensions of the related front and side walls so that it overhangs the front and side walls, as well as back wall 11, when in place. The periphery of top plate 15 is provided with rim flanges extending downwardly along each of the four sides of the housing and parallel thereto, the rim flanges being designated 13a, 14a—14a, and 11a, corresponding, respectively, to front wall 13, side wall 14 and back plate 11. Back plate 11 is provided, along its upper edge, with a forwardly off-set flange 16 which is adapted to slidably fit inside flange 11a for mounting front cover 12 on the back plate. The arrangement and relative shapes of flange 16 and flange 11a are such as to form a type of hinge having a sufficient degree of looseness to allow front cover 12 to swing downwardly and forwardly over rectifier unit 10 when the latter has been mounted on the back plate, as will be subsequently described. As illustrated, the back of front cover 12 is open at 17 between side walls 14—14 to permit entrance of rectifier unit 10 into the cover when the latter is mounted on the back plate, as described.

The width of opening 17, at the back of the front cover, is such as to snugly receive the side edges of back plate 11 when the cover has been secured in place over the back plate. A pair of stop rails 18—18 extend just inside the rearward edges of side walls 14—14 and parallel thereto engage the front face of back plate 11 whereby to limit the rearward movement of the front cover and to provide a snug fit for the back plate within the enclosure formed by the side walls of the front cover. Back plate 11 is provided at its lower edge with a forwardly extending flange 19 which is adapted to form a portion of the bottom wall of the housing. The remainder of the bottom wall of the housing is formed by means of a screen 20, or other perforate wall element which is enclosed within a rectangular frame defined by inwardly-turned flanges 21 on the lower edges of walls 13 and 14—14, together with a transverse frame member 22 extending between side walls 14—14 forwardly of the back edges of the side walls. The dimensions of the frame enclosing screen 20 are such as to complement flange 19 and, together therewith, form a complete closure for the bottom of the housing. A conventional type of snap lock 23 is mounted on the bottom of flange 19 and is adapted to engage a catch 24 provided on frame member 22 and thereby releasably lock the bottom of the front cover to flange 19. Screened openings 25 are provided in the front and side walls, near their upper edges, to form air-circulation passages through the housing in co-operation with screen 20. Flange 19 may also be provided with laterally spaced openings 26—26 for passage of current leads, as will be subsequently described. Back plate 11 may be secured in any suitable manner to a mounting bracket 27, which may be channel-shaped, as shown, and by means of which the housing and the enclosed rectifier unit may be securely mounted on a power pole or other suitable supporting structure. The channel-shape of bracket 27 is convenient for serving as a conduit through which the power leads entering the rectifier unit may be led.

The rectifier unit 10 is mounted in a suitable supporting chassis 30 which includes a back wall 31 and spaced parallel side rails 32—32 extending rearwardly from the back wall and vertically along its side edges. Rails 32—32 are provided with outwardly turned longitudinal edge flanges 33—33, which are adapted to seat against the front face of back plate 11, the flanges 33—33 being positioned just inside the side edges of back plate 11. Each of the flanges 33 is provided with spaced openings 34 adapted to register with and receive the ends of studs 35 which project forwardly from back plate 11, the studs preferably being permanently secured to the back plate. The rectifier unit and its appurtenant elements, including the ammeter A, is mounted on the front face of back wall 31.

Front wall 13 of the cover may be provided with a peep hole 40 opposite the face of ammeter A and a closure plate 41 is pivoted on the front wall to swing between positions opening and closing the peep hole.

It will be seen that the rectifier unit, supported on chassis 30, may be mounted directly on back plate 11 by merely aligning openings 34 with studs 35 and pushing the chassis rearwardly against back plate 11, the studs being thereby projected through openings 34. The chassis may then be secured in place on the back plate by means of nuts 36 which are screwed down on the projecting ends of the studs.

To provide the electrical connections between the external A.C. power supply and the rectifier unit, and between the latter and the load or apparatus utilizing the rectifier current, a plug-in type of switch structure is provided between back wall 11 and back plate 31, so arranged that the rearward movements by which the rectifier unit is mounted on studs 35 and pushed home against back plate 11, will close the switch connections, while removal of the rectifier unit from the back plate will open the switch connections.

The plug-in type switch structure comprises a female or receptacle portion 37 mounted on the forward face of back plate 11, and a male or plug portion 38 mounted on the rear face of back wall 31. Receptacle portion 37 carries upper and lower pairs of friction-type sockets 37a and 37b, respectively, while plug portion 38 carries rearwardly projecting upper and lower pairs of prong-type contacts 38a and 38b, respectively. The two parts of the switch are mounted, as shown, so that contacts 38a and 38b will be in registration with the respective sockets 37a and 37b. When chassis 30 is mounted on the back plate, contacts 38a and 38b will be forced automatically into sockets 37a and 37b, respectively, when the chassis pushed back against back plate 11 (FIG. 5). Upper sockets 37a will be connected by means of a current conductor 43 which is led into the housing through one of the openings 26 to the external source of A.C. current (not shown). Lower sockets 37b are connected to a D.C. current conductor 44 which is led out of the housing through the other opening 26 to apparatus (not shown), utilizing the rectified D.C. current.

From the foregoing, it will be seen that when the rectifier unit is put in place on back plate 11, the entrance of upper contacts 38a into sockets 37a will close the electrical connection between the external source of the A.C. power supply and the rectifier unit via leads 39 which extend through back wall 31 to the rectifier unit. The rectified current is brought out through the lower pair of contacts 38b by leads (not shown) which connect to these contacts on the front side of back wall 31, and the engagement of contacts 38b with lower sockets 37b completes the electrical connection for the D.C. current to the output conductor 44.

From the above description, it will be readily seen that when necessary to service the rectifier unit, the cover 12 may be removed by releasing latch 23, pulling cover 12 forwardly and lifting it off of flange 16. The entire rectifier unit may then be removed by removing the nuts 36 and pulling chassis 30 forwardly, this movement pulling both sets of switch contacts 38a and 38b out of the related sockets 37a and 37b without in any way disturbing any of the external wiring. A replacement rectifier unit may then be installed by mounting the chassis of the replacement unit on studs 35, in the manner previously described, the electrical connections being thereby plugged in automatically to place the rectifier again in operation with a minimum of effort and loss of time.

It will be understood that various changes and modifications may be made in the details of the illustrative embodiment within the scope of the appended claim but without departing from the spirit of this invention.

What I claim and desire to secure by Letters Patent is:

The combination of a current rectifier and housing therefor, comprising, a housing including a back wall, a front cover separably attachable to said back wall and forming therewith a generally box-like enclosure, a current rectifier unit enclosable within said housing, said rectifier unit including a supporting chassis having a rear wall removably mountable on the inner face of said back wall, and switch means including separable switch portions mounted in registering relation on the opposed faces of said back and rear walls, whereby mounting of said chassis on said back wall will automatically effect electrical inter-engagement of said switch portions, said front cover including a front wall, side walls spaced apart to receive said back wall and the rectifier unit mounted thereon, a top wall, and a perforate bottom wall extending rearwardly from said front wall to a point short of the rear edges of said side walls, said back wall having a flange extending forwardly from its lower edge between said side walls to complement said bottom wall in closing the bottom of said housing, said top wall and the upper edge of said back wall having separable inter-engageable portions adapted to separably support said front cover on said back wall, and latch means releasably connecting said bottom wall to said flange.

References Cited in the file of this patent
UNITED STATES PATENTS

| | | |
|---|---|---|
| 1,610,479 | Scott | Dec. 14, 1926 |
| 2,293,158 | Merkel | Aug. 18, 1942 |
| 2,439,412 | Mitchell | Apr. 13, 1948 |
| 2,471,011 | Shapiro | May 24, 1949 |
| 2,609,268 | Nye | Sept. 2, 1952 |
| 2,709,224 | Garnick | May 24, 1955 |
| 2,871,457 | Jencks | Jan. 27, 1959 |